US011859064B2

(12) United States Patent
Mazumder et al.

(10) Patent No.: US 11,859,064 B2
(45) Date of Patent: Jan. 2, 2024

(54) METHODS OF MODIFYING A SUBSTRATE BY ELASTOCAPILLARY DEFORMATION

(71) Applicant: CORNING INCORPORATED, Corning, NY (US)

(72) Inventors: Prantik Mazumder, Ithaca, NY (US); Wageesha Senaratne, Horseheads, NY (US)

(73) Assignee: CORNING INCORPORATED, Corning, NY (US)

( * ) Notice: Subject to any disclaimer, the term of this patent is extended or adjusted under 35 U.S.C. 154(b) by 510 days.

(21) Appl. No.: 17/056,950

(22) PCT Filed: May 23, 2019

(86) PCT No.: PCT/US2019/033729
§ 371 (c)(1),
(2) Date: Nov. 19, 2020

(87) PCT Pub. No.: WO2019/226885
PCT Pub. Date: Nov. 28, 2019

(65) Prior Publication Data
US 2021/0206930 A1 Jul. 8, 2021

Related U.S. Application Data

(60) Provisional application No. 62/676,400, filed on May 25, 2018.

(51) Int. Cl.
*B32B 41/00* (2006.01)
*C08J 7/02* (2006.01)
(Continued)

(52) U.S. Cl.
CPC ............. *C08J 7/02* (2013.01); *B29C 71/0009* (2013.01); *B32B 17/10* (2013.01); *C08J 5/12* (2013.01); *C08J 7/06* (2013.01); *C08J 2383/07* (2013.01)

(58) Field of Classification Search
CPC ......... C08J 7/02; C08J 5/12; C08J 7/06; C08J 2383/07; B29C 71/0009; B32B 17/10; C03C 2217/42; C03C 17/30; C03C 17/42
(Continued)

(56) References Cited

U.S. PATENT DOCUMENTS

| 4,217,038 A | 8/1980 | Letter et al. |
| 2010/0061218 A1 | 3/2010 | Miura et al. |

(Continued)

FOREIGN PATENT DOCUMENTS

| CN | 112399922 A * | 2/2021 | ........... A46B 13/001 |
| TW | 200705432 A | 2/2007 | |

(Continued)

OTHER PUBLICATIONS

Taiwanese Patent Application No. 108118054, Office Action dated Dec. 28, 2022, 2 pages (English Translation Only); Taiwanese Patent Office.

(Continued)

*Primary Examiner* — Michael N Orlando
*Assistant Examiner* — Joshel Rivera
(74) *Attorney, Agent, or Firm* — Daniel J. Greenhalgh

(57) ABSTRACT

A method of modifying a deformable substrate that includes depositing a sessile liquid droplet on a first surface of a deformable substrate, the sessile liquid droplet forming a deformed region in the first surface of the deformable substrate, the deformed region having a recess and a perimeter rim, the recess extending toward a second surface of the deformable substrate, and the perimeter rim extending away from the second surface of the deformable substrate and curing the deformable substrate, thereby increasing an elastic modulus of the deformable substrate such that upon removal of the sessile liquid droplet, the deformed region remains in the first surface of the deformable substrate.

20 Claims, 9 Drawing Sheets

(51) Int. Cl.
*B32B 17/10* (2006.01)
*B29C 71/00* (2006.01)
*C08J 5/12* (2006.01)
*C08J 7/06* (2006.01)

(58) Field of Classification Search
USPC .................. 156/60, 64, 350, 351, 378, 379
See application file for complete search history.

(56) References Cited

U.S. PATENT DOCUMENTS

| | | |
|---|---|---|
| 2010/0239789 A1 | 9/2010 | Umeda |
| 2012/0226001 A1 | 9/2012 | Brook et al. |
| 2015/0240086 A1 | 8/2015 | Iwata et al. |
| 2018/0031904 A1 | 2/2018 | Lander et al. |

FOREIGN PATENT DOCUMENTS

| | | |
|---|---|---|
| TW | 201418000 A | 5/2014 |
| WO | 2011/022827 A1 | 3/2011 |

OTHER PUBLICATIONS

Deegan et al., "Capillary flow as the cause of ring stains from dried liquid drops", Nature 389, 827-829.
International Search Report and Written Opinion of The International Searching Authority; PCT/US2019/033729; dated Sep. 10, 2019; 9 Pages; Korean Patent Office.
Lester G.R. (1961), Contact angles of liquids at deformable solid surfaces, J. Colloid Sci., 16, 315.
Pericet-Camara R., Auernhammer G.K., Koynov K., Lorenzoni S., Raiteri R., Bonaccurso E. (2009), Soft Matter, 5, 3611.
Pericet-Camara R., Best A., Butt H., Bonaccurso E.(2008), Langmuir, 24, 10565.
Rusanov A. I. (1975), Colloid J. USSR, 37, 614.
Shanahan, M.E.R. and de Gennes P.G. (1986), Compt. Rend. Acad. Sci., 302, 517.

\* cited by examiner

US 11,859,064 B2

METHODS OF MODIFYING A SUBSTRATE BY ELASTOCAPILLARY DEFORMATION

CROSS-REFERENCE TO RELATED APPLICATION

This application claims the benefit of priority under 35 U.S.C. § 371 of International Application No. PCT/US2019/033729, filed on May 23, 2019, which claims the benefit of priority of U.S. Provisional Application Ser. No. 62/676,400 filed on May 25, 2018 the contents of which are relied upon and incorporated herein by reference in their entirety as if fully set forth below.

BACKGROUND

The present specification generally relates to methods for modifying a substrate, and more particularly, to modifying a deformable substrate using the elastocapillary forces of a sessile liquid droplet.

SUMMARY

According to one embodiment, a method of modifying a deformable substrate includes depositing a sessile liquid droplet on a first surface of a deformable substrate, the sessile liquid droplet forming a deformed region in the first surface of the deformable substrate, the deformed region having a recess and a perimeter rim, the recess extending toward a second surface of the deformable substrate, and the perimeter rim extending away from the second surface of the deformable substrate and curing the deformable substrate, thereby increasing an elastic modulus of the deformable substrate such that upon removal of the sessile liquid droplet, the deformed region remains in the first surface of the deformable substrate.

According to another embodiment, a method of modifying a deformable substrate includes depositing a deformable substrate on a second substrate, depositing a sessile liquid droplet comprising a plurality of nanoparticles on a first surface of the deformable substrate, the sessile liquid droplet forming a deformed region in the first surface of the deformable substrate, the deformed region having a recess and a perimeter rim, the recess extending toward a second surface of the deformable substrate, and the perimeter rim extending away from the second surface of the deformable substrate and curing the deformable substrate, thereby increasing an elastic modulus of the deformable substrate such that upon removal of the sessile liquid droplet, the deformed region remains in the first surface of the deformable substrate and at least a portion of the plurality of nanoparticles are embedded in the perimeter rim of the deformed region of the deformable substrate, thereby forming an angular filter in the perimeter rim of the deformed region of the deformable substrate.

Additional features and advantages of the processes and systems described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1A:
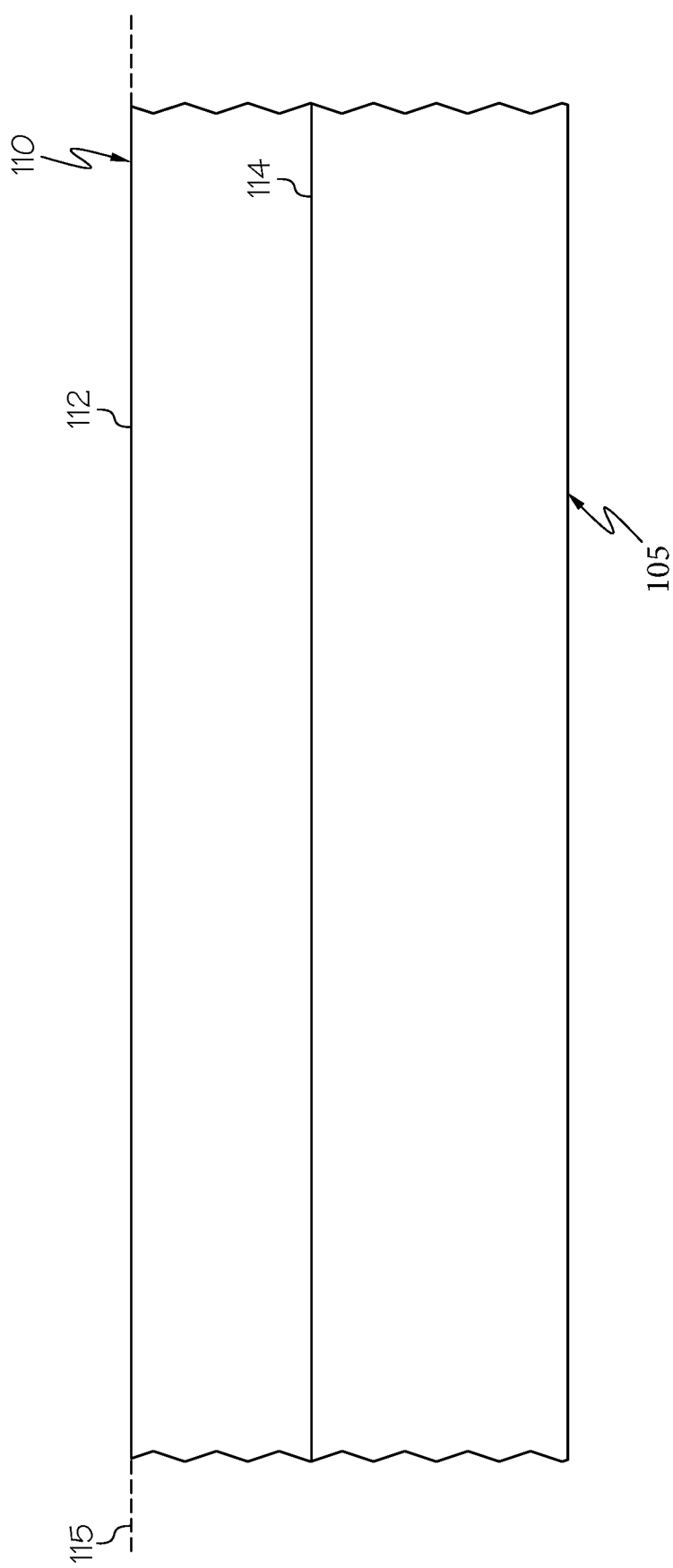
FIG. 1A schematically depicts a deformable substrate disposed on a second substrate, according to one or more embodiments described herein.

Reference will now be made in detail to embodiments of processes for modifying a deformable substrate, examples of which are illustrated in the accompanying drawings. Whenever possible, the same reference numerals will be used throughout the drawings to refer to the same or like parts. The method described herein may be used to create a deformed region in a deformable substrate using a sessile liquid droplet. The method includes depositing a sessile liquid droplet on a surface of the deformable substrate, such that the sessile liquid droplet forms a deformed region in the deformable substrate via elastocapillary deformation, then curing the deformed substrate to increase the elastic modulus of the deformable substrate such that, upon removal of the sessile liquid droplet, the deformed region remains in the deformable substrate. Before curing, the deformable substrate comprises an initial elastic modulus that is small enough that the elastocapillary force applied by the sessile liquid droplet deforms the deformable substrate. Curing the deformable substrate increases the elastic modulus of the deformable substrate (i.e. increases the elastic modulus from the initial elastic modulus to a cured elastic modulus), such that when the sessile liquid is removed from the deformable substrate, the deformable substrate does not deflect back to its original shape and the deformed region remains in the deformable substrate. The method described herein provides a tunable, low cost process for creating structures directly on the deformable substrate that offers cost and adjustability improvements over previous methods, such as photolithography, laser patterning, printing, convective assembly (e.g., coffee-ring patterning), or the like.

Referring now to FIG. 1A, an example deformable substrate 110 is schematically depicted. The deformable substrate 110 comprises a first surface 112, a second surface 114 opposite the first surface 112, and an undeformed plane 115, which is the plane of an undeformed portion the first surface 112, for example, the plane of the first surface 112 before the deformable substrate 110 is deformed. In FIG. 1A, the undeformed plane 115 is co-located with the first surface 112, however, when the first surface 112 includes a deformed region 120 (FIGS. 1C and 1D), the undeformed plane 115 is offset from at least portions of the deformed region 120. Further, the deformable substrate 110 comprises a curable substrate. In some embodiments, the deformable substrate 110 may comprise a polymer, such as polyvinylsiloxane, polydimethylsiloxane (PDMS), ultraviolet (UV) curable polyacrylate, epoxy polymer, thermosetting polymer, or combinations thereof. In some embodiments, the deformable substrate 110 may further comprise a curing agent, for example, peroxide, platinum complex solution, a photoinitiator, or combinations thereof.

The deformable substrate 110 comprises an initial elastic modulus and a cured elastic modulus, which is greater than the initial elastic modulus. In particular, the initial elastic modulus is small enough that the deposition of a sessile liquid droplet 160 (FIG. 1B) on the first surface 112 of the deformable substrate 110 deforms the deformable substrate 110 when the deformable substrate 110 comprises the initial elastic modulus. Further, the cured elastic modulus is large enough that the deposition of the sessile liquid droplet 160 on the first surface 112 of the deformable substrate 110 does not deform the deformable substrate 110 when the deformable substrate 110 comprises the cured elastic modulus. Thus, the deformed region 120 may be formed in the deformable substrate 110 by first depositing the sessile liquid droplet 160 on the first surface 112 of the deformable substrate 110 when the deformable substrate 110 comprises the initial elastic modulus and then curing the deformable substrate 110, while the sessile liquid droplet 160 is on the first surface 112, to increase the elastic modulus from the initial elastic modulus to the cured elastic modulus. Once the deformable substrate 110 comprises the cured elastic modulus, the first surface 112 will not deflect back to its original shape and the deformed region 120 will remain in the first surface 112 when the sessile liquid droplet 160 is removed.

In some embodiments, the initial elastic modulus of the deformable substrate 110 may comprise about 800 kPa or less, for example, about 500 kPa or less, 250 kPa or less, 100 kPa or less, 50 kPa or less, 25 kPa or less, 10 kPa or less, 5 kPa or less, 1 kPa or less, or the like, for example, from about 0.1 kPa to about 800 kPa, from about 0.1 kPa to about 100 kPa, from about 0.1 kPa to about 50 kPa, from about 0.1 kPa to about 25 kPa, from about 0.1 kPa to about 10 kPa, from about 0.1 kPa to about 5 kPa, from about 0.1 kPa to about 2 kPa, from about 0.1 kPa to about 1 kPa, from about 0.5 kPa to about 1 kPa, from about 0.5 kPa to about 2 kPa, from about 0.5 kPa to about 3 kPa, from about 0.5 kPa to about 5 kPa, from about 0.5 kPa to about 10 kPa, from about 0.5 kPa to about 25 kPa, from about 0.5 kPa to about 50 kPa, from about 0.5 kPa to about 100 kPa, or the like. Further, the cured elastic modulus may comprise about 100 kPa or greater, for example, about 200 kPa or greater, about 500 kPa or greater, about 800 kPa or greater, about 1 GPa or greater, about 2 GPa or greater, about 5 GPa or greater, about 10 GPa or greater or the like, such as from about 100 kPa to about 10 GPa, about 500 kPa to about 10 GPa, from about 800 GPa to about 10 GPa, from about 1 GPa to about 10 GPa, from about 1 GPa to about 5 GPa, or the like.

Figure 1B:
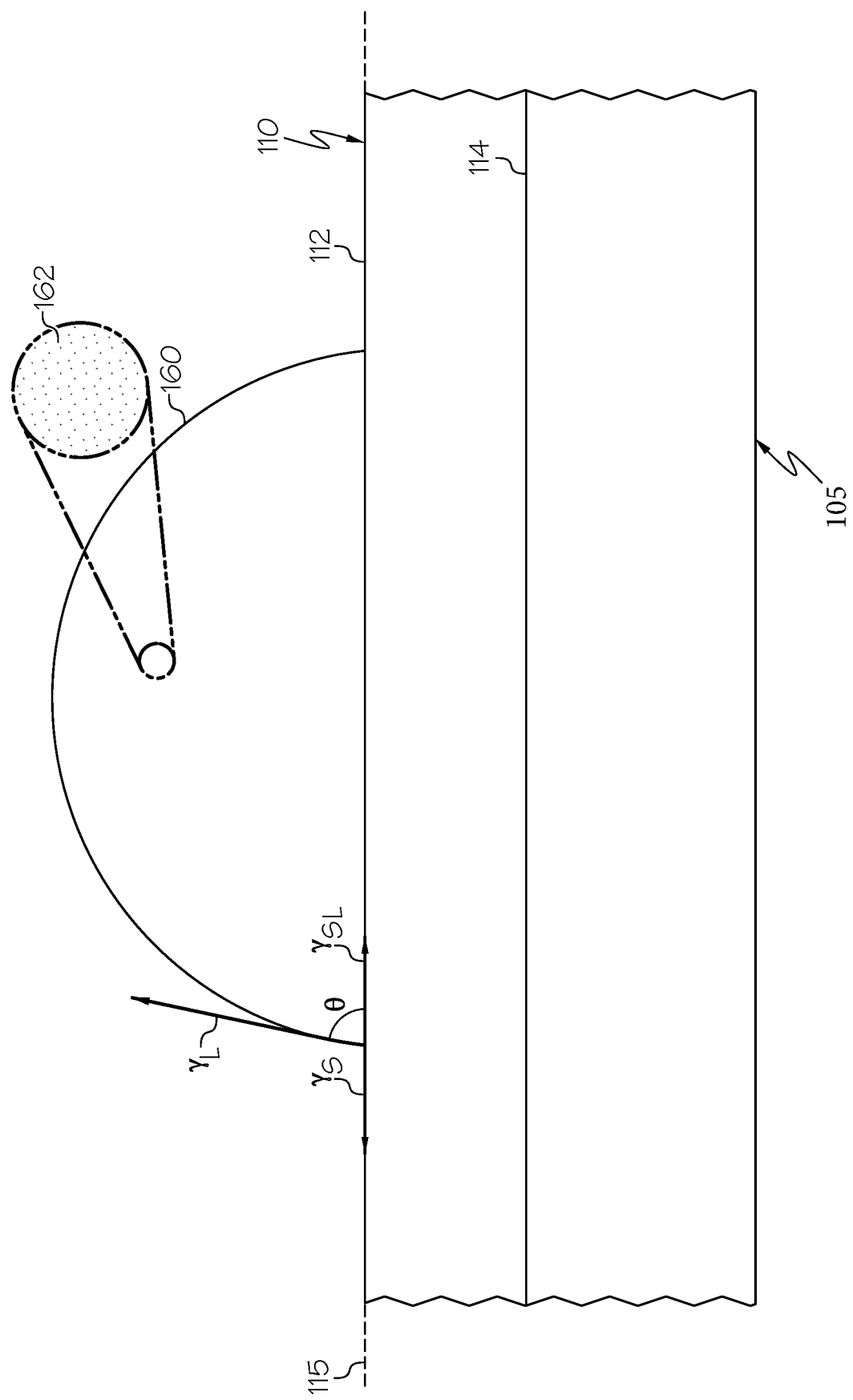
FIG. 1B schematically depicts a sessile liquid droplet disposed on the deformable substrate of FIG. 1A, according to one or more embodiments described herein.
Figure 1C:
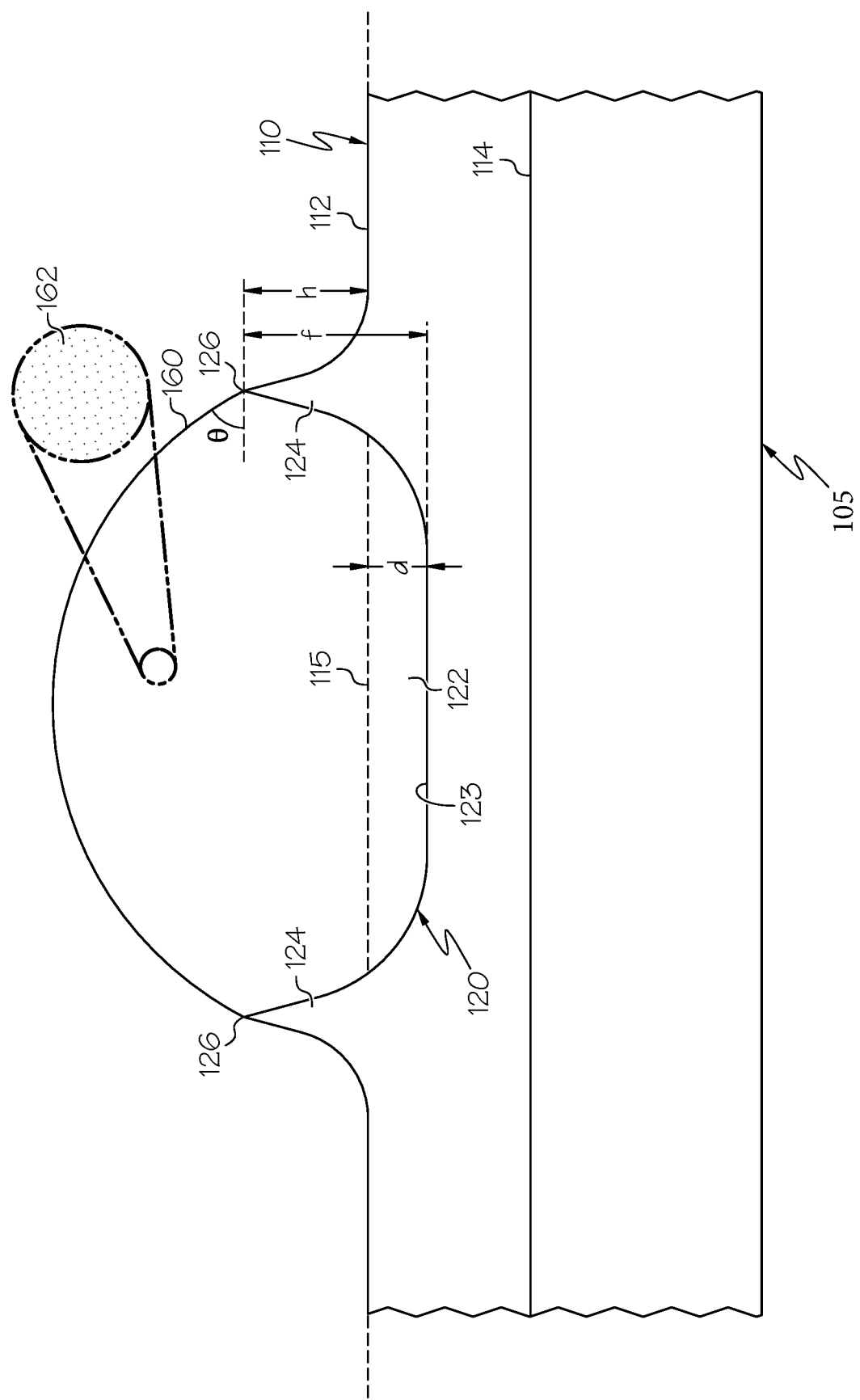
FIG. 1C schematically depicts a deformed region of the deformable substrate of FIG. 1B formed by the sessile liquid droplet of FIG. 1B, according to one or more embodiments described herein.

Referring now to FIGS. 1B and 1C, the deformable substrate 110 is schematically depicted with the sessile liquid droplet 160 disposed on the first surface 112 of the deformable substrate 110 before deformation of the deformable substrate 110 (FIG. 1B) and after deformation of the deformable substrate 110 (FIG. 1C). While no deformation of the deformable substrate 110 is depicted in FIG. 1B, it should be understood that in some embodiments, the sessile liquid droplet 160 may begin to deform the deformable substrate 110 immediately upon contact between the sessile liquid droplet 160 and the deformable substrate 110. The sessile liquid droplet 160 may comprise any liquid having a surface tension of about 40 dynes/cm or greater. In some embodiments, the sessile liquid droplet 160 comprises a surface tension of about 45 dynes/cm or greater, about 50 dynes/cm or greater, about 55 dynes/cm or greater, about 60 dynes/cm or greater, or the like. Example sessile liquid droplets 160 include water, a polyol liquid, such as ethylene glycol and glycerol, or a combination thereof.

The sessile liquid droplet 160 may also include a plurality of nanoparticles 162. The plurality of nanoparticles 162 may comprise any particle comprising a higher refractive index than the deformable substrate 110. Example nanoparticles 162 include $TiO_2$, zinc oxide, zirconium oxide, silica, alumina, cerium oxide, or a combination thereof. In some embodiments, when the sessile liquid droplet 160 comprises a plurality of nanoparticles 162, the plurality of nanoparticles 162 may comprise from about 5 weight percent (wt %) to about 30 wt % of the sessile liquid droplet 160, for example 10 wt %, 15 wt %, 20 wt %, 25 wt %, or the like.

Figure 1D:
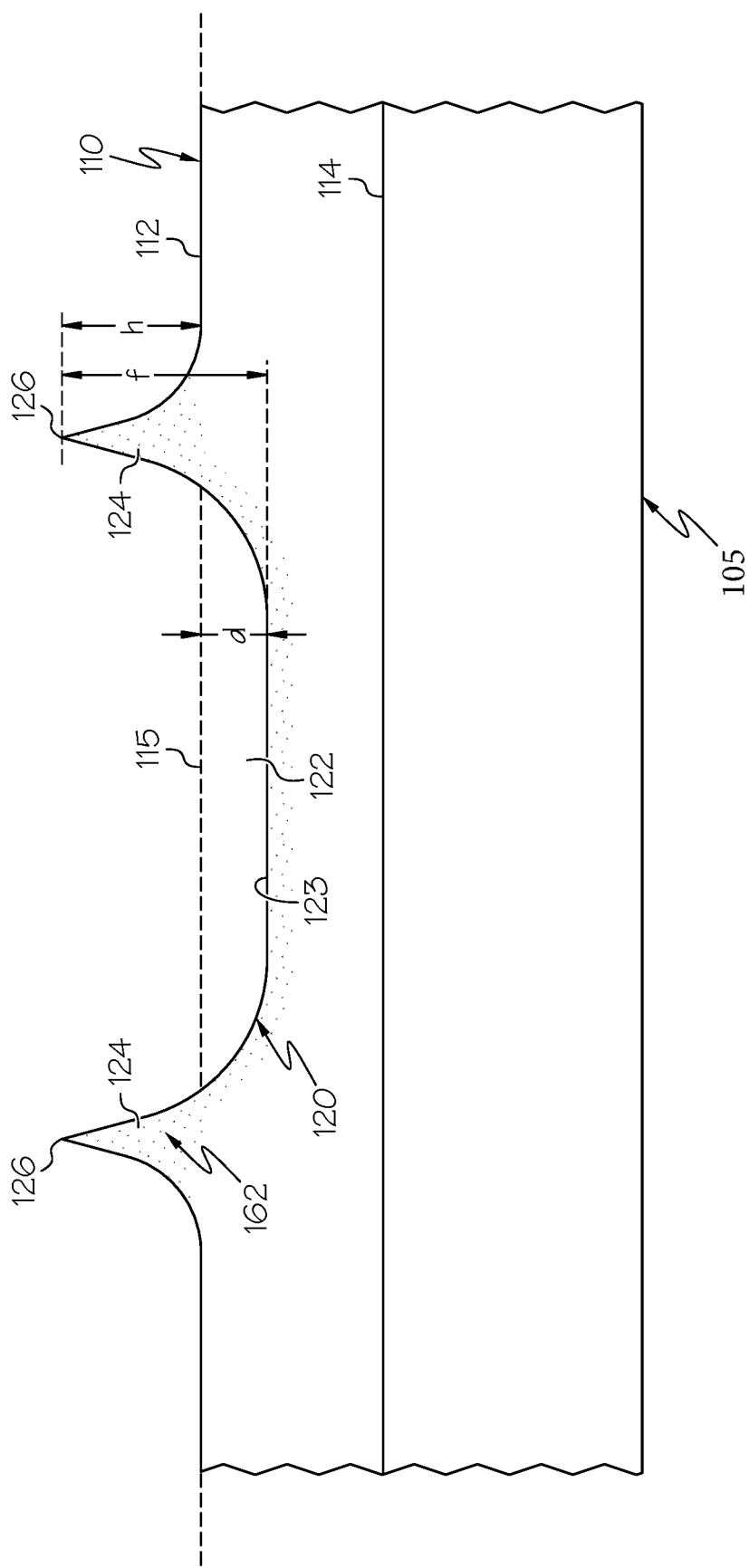
FIG. 1D schematically depicts the deformed region of the deformable substrate of FIG. 1C, without the presence of the sessile liquid droplet, according to one or more embodiments described herein.

As depicted in FIGS. 1C and 1D, the deformed region 120 comprises a recess 122 and a perimeter rim 124. The recess 122 extends into the deformable substrate 110 beyond the undeformed plane 115 in a direction toward the second surface 114 (e.g., downward as depicted in FIG. 1C). The recess 122 terminates at a recess floor 123 and comprises a recess depth d, which is the distance from the undeformed plane 115 to the recess floor 123. In some embodiments, the recess depth d may be from about 10 nm to about 50 µm, for example, from about 50 nm to about 25 µm, from about 50 nm to about 10 µm, from about 50 nm to about 7.5 µm, from about 50 nm to about 5 µm, from about 100 nm to about 5 µm, from about 250 nm to about 5 µm, from about 500 nm to about 5 µm, from about 750 nm to about 5 µm, from about 1 µm to about 5 µm, from about 1 µm to about 2.5 µm, or the like.

Further, the perimeter rim 124 extends outward from the deformable substrate 110 beyond the undeformed plane 115 in a direction away from the second surface 114. The perimeter rim 124 terminates at a rim tip 126. Further, the perimeter rim 124 comprises a rim height h, which is the distance from the undeformed plane 115 to the rim top 126. In some embodiments, the rim height h may be from about 50 nm to about 100 µm, for example, from about 100 nm to about 75 µm, from about 100 nm to about 50 µm, from about 100 nm to about 25 µm, from about 100 nm to about 15 µm, from about 100 nm to about 10 µm, from about 100 nm to about 7.5 µm, from about 100 nm to about 5 µm, from about 250 nm to about 5 µm, from about 500 nm to about 5 µm, from about 750 nm to about 5 µm, from about 1 µm to about 5 µm, from about 1 µm to about 4 µm, from about 1 µm to about 4 µm, or the like. A full distance f, which is the sum of the recess depth d and the rim height h is also depicted FIGS. 1C and 1D.

While FIGS. 1C and 1D show schematic cross-sections of the deformable substrate 110, it should be understood that the deformed region 120 comprises a circular or otherwise closed and rounded shape, as the sessile liquid droplet 160 forms a rounded shape on the first surface 112 of the deformable substrate 110. The deformed region 120 may comprise a maximum cross sectional dimension (e.g., diameter in circular embodiment measured at the rim tip 126) of from about 200 µm to about 800 µm, for example about 300 µm, 400 µm, 500 µm, 600 µm, 700 µm, or the like.

Referring again to FIGS. 1B and 1C, the sessile liquid droplet 160 comprises a contact angle θ measured at a liquid-vapor-solid interface of the sessile liquid droplet 160 and the deformable substrate 110. The contact angle θ is mathematically related to properties of the deformable substrate 110 via Young's equation: $\gamma_{SL} + \gamma_L \cos\theta = \gamma_S$, where $\gamma_{SL}$ is the solid-liquid interfacial energy between the sessile liquid droplet 160 and the deformable substrate 110, $\gamma_L$ is the surface tension of the sessile liquid droplet 160, and $\gamma_S$ is the surface energy of the deformable substrate 110. Without intending to be limited by theory, the vertical component $Y_L \sin\theta$ of the liquid surface tension of the sessile liquid droplet 160 cannot remain unbalanced while maintaining the stationary condition of the solid-liquid-vapor three phase contact line at the interface of the sessile liquid droplet 160 and the first surface 112 of the deformable substrate 110. Thus, the vertical component $Y_L \sin\theta$ of the liquid surface tension of the sessile liquid droplet 160 pulls the first surface 112 of the deformable substrate 110 (e.g., capillary pulling) and creates a tensile deformation (e.g., the deformed region 120) in the first surface 112 having portions that both extend in a direction toward from the second surface 114 (the perimeter rim 124) and in a direction toward the second surface 114 (the recess 122). Further, the sessile liquid droplet 160 deforms the first surface 112 of the deformable substrate 110 until equilibrium is established between the vertical component $Y_L \sin\theta$ of the liquid surface tension of the sessile liquid droplet 160 and the opposing vertical component of the surface energy $\gamma_S \sin\theta$ of the deformable substrate 110, which increases as the deformable substrate 110 is deformed. Thus, while not intending to be limited by theory, the rim height h is related to the vertical component $Y_L \sin\theta$ of the liquid surface tension of the sessile liquid droplet 160 and the initial elastic modulus E of the deformable substrate 110, where $$h = \frac{\gamma_L \sin\theta}{E}.$$

Figure 2:
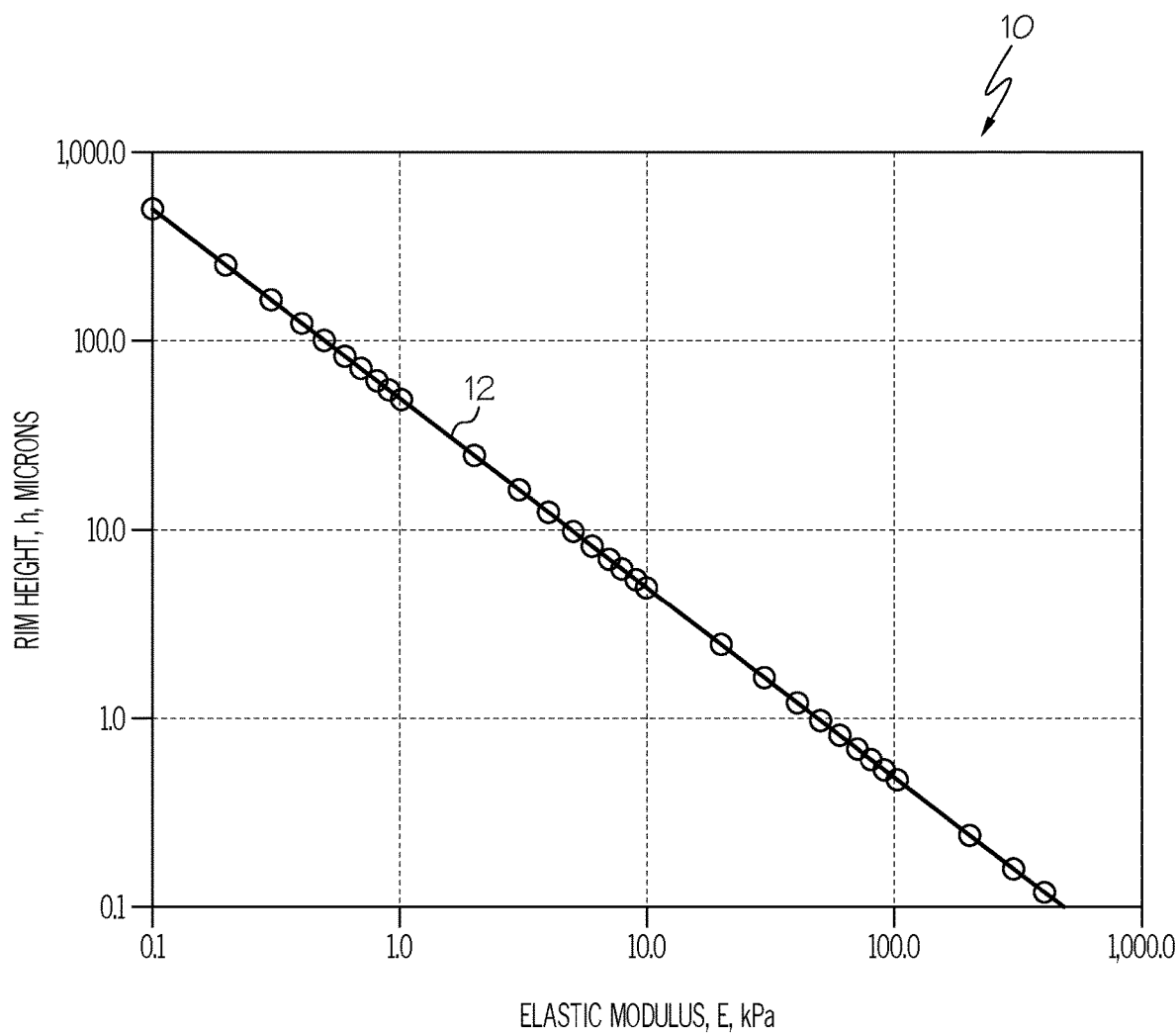
FIG. 2 depicts a graphical relationship between a rim height of a deformed region formed in a deformable substrate and an initial elastic modulus of the deformed substrate, according to one or more embodiments described herein.

Referring now to FIG. 2, a graph 10 is depicted showing relationship between the rim height h of the perimeter rim 124 of the deformed region 120 formed in the deformable substrate 110 using the methods described herein, and the initial elastic modulus of the deformable substrate 110. Line 12 shows that as the initial elastic modulus of the deformable substrate 110 increases, the rim height h decreases and line 12 shows that the initial elastic modulus of the deformable substrate 110 has a logarithmic relationship with the rim height h. Further, as shown in FIG. 2, when the initial elastic modulus of the deformable substrate 110 is about 1 GPa or greater, little to no deformation is caused by the elastocapillary forces of the sessile liquid droplet 160.

Referring again to FIGS. 1A-1D, a method of modifying the deformable substrate 110 includes depositing the sessile liquid droplet 160 on the first surface 112 of the deformable substrate 110, the sessile liquid droplet 160 forming the deformed region 120 in the first surface 112 in the deformable substrate 110. As described above, the deformed region 120 is formed by elastocapillary deformation when the sessile liquid droplet 160 is disposed on the first surface 112 of the deformable substrate 110. However, if the sessile liquid droplet 160 is removed from the deformable substrate 110 while the deformable substrate 110 comprises the initial elastic modulus, the first surface 112 will deflect back to its original shape, removing the deformed region 120 from the first surface 112 of the deformable substrate 110.

Thus, the method next comprises curing the deformable substrate 110 while the sessile liquid droplet 160 is in contact with the first surface 112 of the deformable substrate 110, thereby increasing the elastic modulus of the deformable substrate 110, for example, from the initial elastic modulus to the cured elastic modulus. In some embodiments, curing the deformable substrate 110 comprises heating the deformable substrate 110, for example, to a curing temperature for a curing period. In other embodiments, curing the deformable substrate 110 comprises irradiating at least the deformed region 120 of the deformable substrate 110 with light, such as ultraviolet light, at a curing wavelength for a curing period. The method next comprises removing the sessile liquid droplet 160 from the deformable substrate 110.

As depicted in FIG. 1D, upon removal of the sessile liquid droplet 160 from the deformable substrate 110, the deformed region 120 remains in the first surface 112 of the deformable substrate 110, as the deformable substrate 110 now comprises the cured elastic modulus. In some embodiments, curing the deformable substrate 110 removes the sessile liquid droplet 160 from the deformable substrate 110, for example, by evaporating the sessile liquid droplet 160. In other embodiments, removing the sessile liquid droplet 160 from the deformable substrate 110 may comprise a separate step performed after curing the deformable substrate 110.

Referring still to FIG. 1D, during formation of the deformed region 120, the plurality of nanoparticles 162 of the sessile liquid droplet 160 may embed into the deformable substrate 110 (FIG. 1D). In some embodiments, the plurality of nanoparticles 162 may embed into the deformed region 120, for example, the perimeter rim 124 of the deformed region 120. When embedded in the deformable substrate 110, the plurality of nanoparticles 162 may alter the refractive index of a portion of the deformable substrate 110 (e.g., the refractive index of the deformed region 120). In some embodiments, the plurality of nanoparticles 162 may be configured to scatter light propagating through the deformable substrate 110. For example, the plurality of nanoparticles 162 comprise a higher refractive index than the deformable substrate 110 and thus, when light propagates through the portion of the deformable substrate 110 having embedded nanoparticles 162 (e.g., the perimeter rim 124), the refractive index difference between the material of the deformable substrate 110 and the individual nanoparticles 162 causes light rays that impinge the nanoparticles 162 to refract in a variety of directions, causing a scattering effect. In some embodiments, mere contact between the sessile liquid droplet 160 and the deformable substrate 110 may embed the plurality of nanoparticles 162 into the deformable substrate 110. In other embodiments, curing the deformable substrate 110 while the sessile liquid droplet 160 contacts the deformable substrate 110 may embed the plurality of nanoparticles 162 into the deformable substrate 110.

In some embodiments, as depicted in FIGS. 1A-1D, the deformable substrate 110 may be disposed on a second substrate 105. For example, the method may further comprise depositing the deformable substrate 110 on the second substrate 105. The second substrate 105 may comprises any substrate having a higher elastic modulus than the initial elastic modulus of the deformable substrate 110. For example, the second substrate 105 may comprise a glass substrate, glass-ceramic substrate, or a ceramic substrate. While the second substrate 105 is depicted in each of FIGS. 1A-1D, it should be understood that the second substrate 105 is an optional component and the methods described herein may be performed with the second substrate 105.

While the methods described herein may be useful in a variety of applications, one example application is in transparent display technology, which allows a user to observe both a display and objects located behind the display. For example, in a retail setting, a transparent display may be located between an observer and a product and may display information while allowing the observer to see the product. A conventional transparent display may include one or more light guide plates that provide edge illumination at angles parallel or near parallel to the display plate (e.g., a glass substrate). However, traditional, opaque filtering films (such as 3M BEF filters), which alter the angular distribution of light rays propagating parallel or near-parallel to the display plate, are not usable in a transparent display application. Thus, the present application may be used to form a transparent or semi-transparent rim structure (e.g., a rim perimeter of a deformed region of a deformable substrate as described above) configured to alter the angular distribution of light rays (e.g., an angular filter) without degrading the transparency of the display. For example, the angular filter functionality may be achieved by embedding a plurality of nanoparticles into the transparent rim structure, for example, scattering particles and/or particles that alter the refractive index of the transparent rim structure, using the methods described herein, to form and angular filter and provide angular distribution functionality.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the specific value or end-point referred to is included. Whether or not a numerical value or end-point of a range in the specification recites "about," two embodiments are described: one modified by "about," and one not modified by "about." It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

EXPERIMENTS

In the following experiments, deformed regions were formed on a variety of deformable substrates using the methods described herein.

Figure 3:
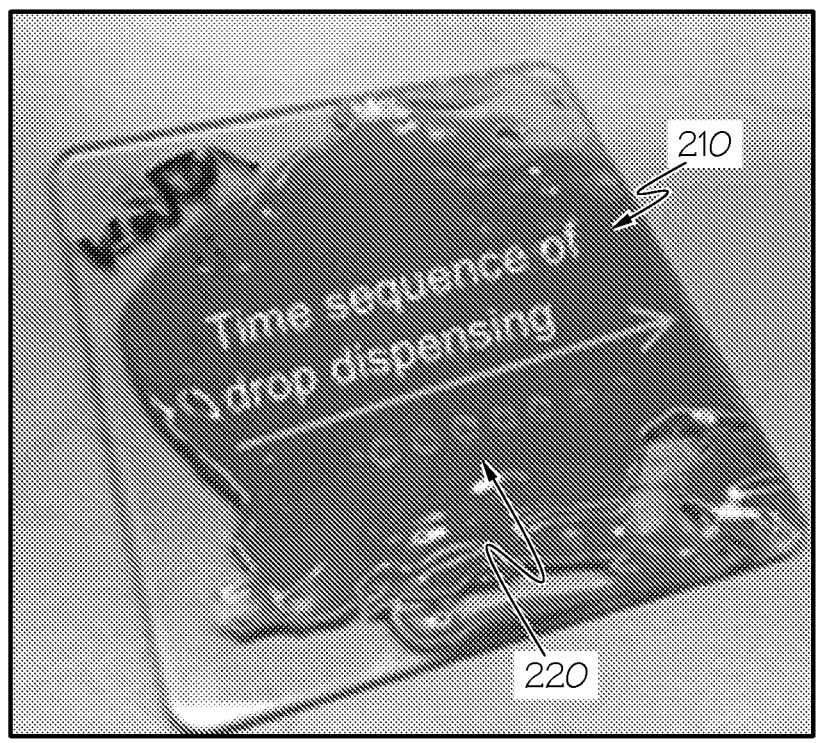
FIG. 3 depicts an example deformable substrate comprising polyvinylsiloxane that includes deformed regions, according to one or more embodiments described herein.

Referring now to FIG. 3, in a first experiment, a deformable substrate 210 comprising a Filtec™ Dental Mold including polyvinylsiloxanes was modified using sessile liquid droplets comprising water to form a plurality of deformed regions 220. In this example, the deformable substrate 210 was spread on a glass surface. Then, water droplets were dispersed in ten second intervals onto the deformable substrate 210 using the Kruss goniometer. Finally, the water droplets were removed from the deformable substrate 210. As shown in FIG. 3, deformed regions 220 were formed and the extent of deformation of each deformed region 220 is smaller with each successive droplet, because the deformable substrate 210 cured while the water droplets were dispersed (i.e. cured at a curing temperature of about room temperature for a curing period of about 1 minute). Thus, the first water droplet deposited created a deformed region with the tallest rim perimeter (i.e., the leftmost deformed region depicted in FIG. 3) and the last water droplet deposited created the deformed region with the shortest rim perimeter (i.e., the rightmost deformed region depicted in FIG. 3).

Figure 4:
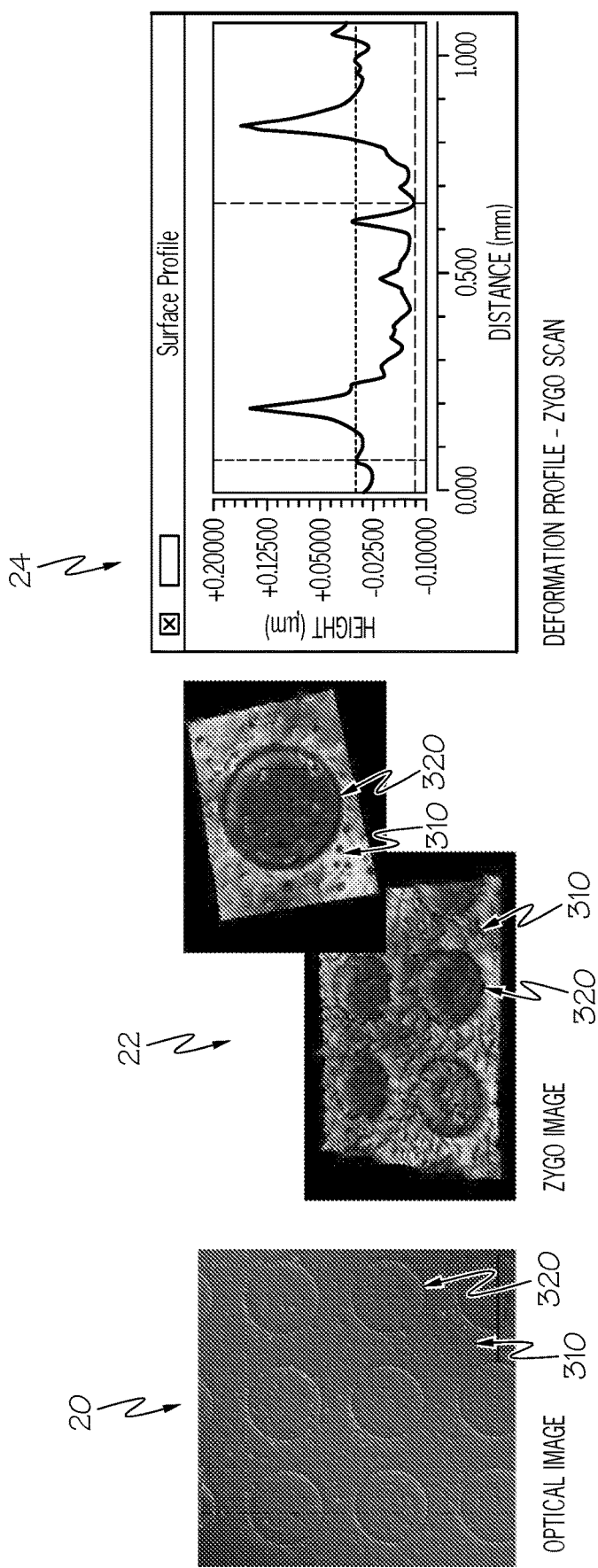
FIG. 4 depicts an optical image, zygo image, and deformation profile of an example deformable substrate comprising polydimethylsiloxane that includes deformed regions, according to one or more embodiments described herein.

Referring now to FIG. 4, in a second experiment, a deformable substrate 310 comprising PDMS and a curing agent was modified using the method described herein. In particular, the deformable substrate 310 comprises a Sylgard™ 184 elastomer in a ratio of from about 1:0.03 to about 1:0.05 of prepolymer to curing agent. In this experiment, droplets of water/ethylene glycol and glycerol were dispensed onto the deformable substrate 110 using an Asymtek Nordson dispenser. The deformable substrate 310 was then cured at a first curing temperature of about 60° C. for a first curing period of about 2 hours and cured at a second curing temperature of from about 120-150° C. for a second curing period of about 30 minutes. FIG. 4 shows an optical image 20, a zygo 3D image 22, and a zygo height profile 24 of the deformable substrate 310 having deformed regions 320. The deformed regions 320 depicted in FIG. 4 comprise a diameter of about 600 μm and a rim height of about 125 μm.

Figure 5A:
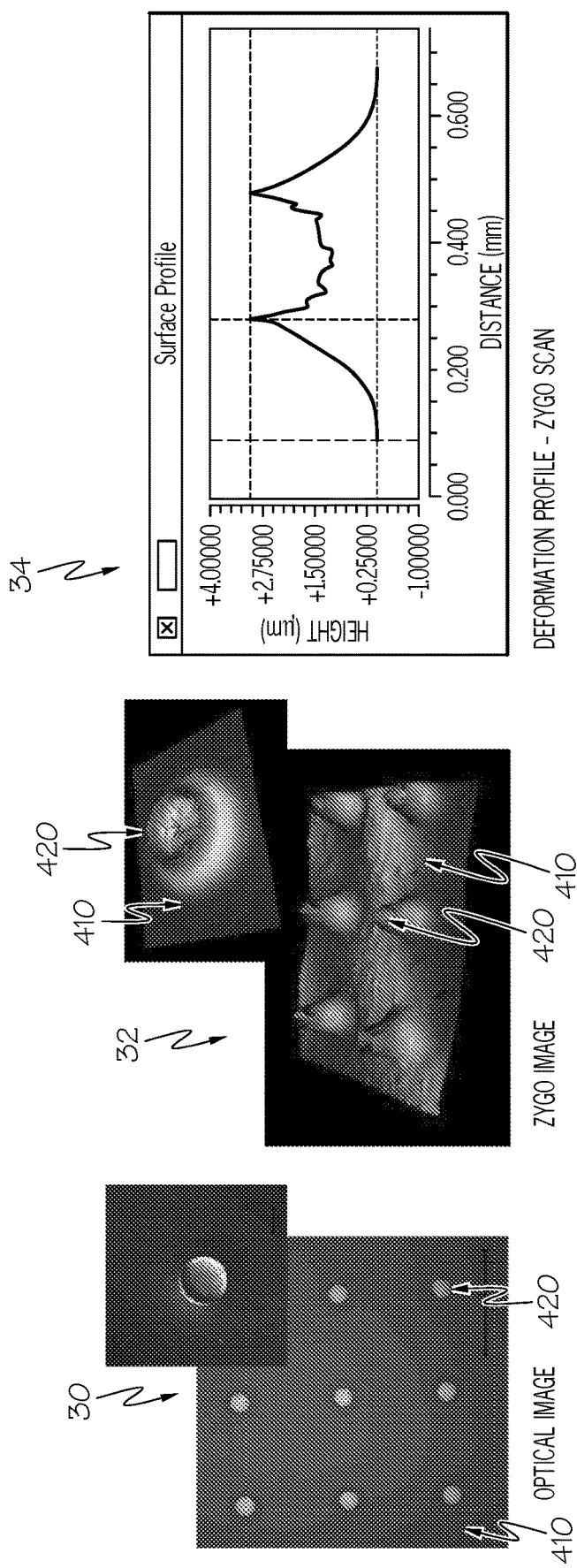
FIG. 5A depicts an optical image, zygo image, and deformation profile of an example deformable substrate comprising polydimethylsiloxane that includes deformed regions and a plurality of embedded nanoparticles, according to one or more embodiments described herein.
Figure 5B:
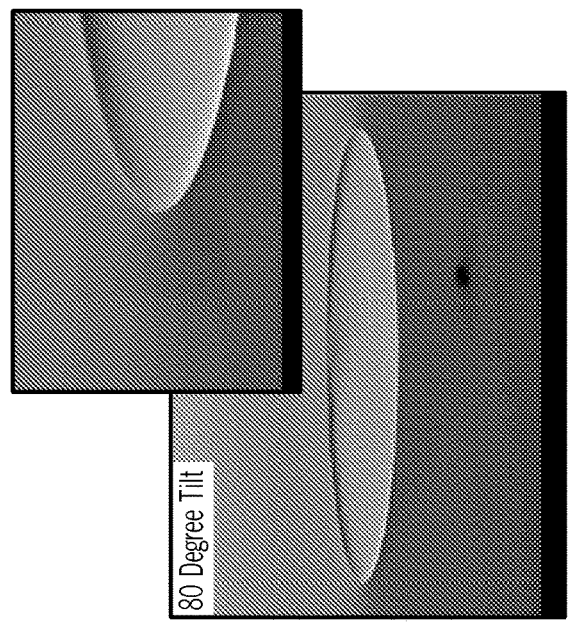
FIG. 5B depicts scanning electron microscope images of the example deformable substrate comprising polydimethylsiloxane that includes deformed regions and a plurality of embedded nanoparticles of FIG. 5A, according to one or more embodiments described herein.
Figure 5B:
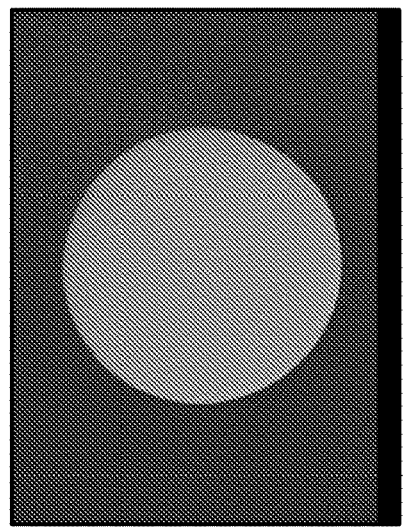
Figure 5B:
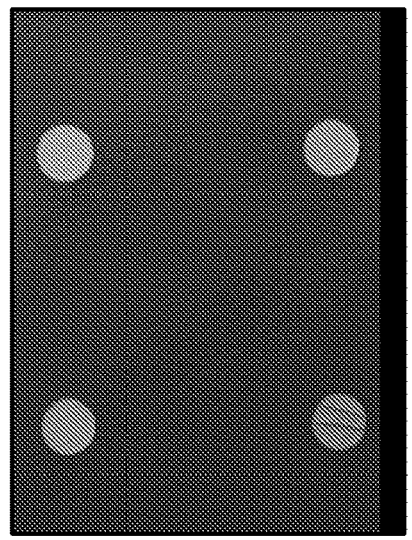

Referring now to FIGS. 5A and 5B, in a third experiment, a deformable substrate 410 comprising PDMS is modified using the method described herein. In the third experiment, a plurality of nanoparticles comprising scattering elements were embedded into the deformable substrate 410 by forming deformed regions 420 using a sessile liquid droplet comprising scattering elements. In particular, the sessile liquid droplets used in the third experiment comprised 15% $TiO_2$ (Sigma), 57% ethylene glycol, and 28% water (viscosity 8.8 cPs, ST 76.6 N/m, pH 2.6). The deformable substrate 410 was then cured using the curing temperatures and curing periods of the second experiment. FIG. 5A shows an optical image 30, a zygo 3D image 32, and a zygo height profile 34 of the deformable substrate 410 having deformed regions 420. During curing, $TiO_2$ particles (i.e. the plurality of nanoparticles) were embedded in the deformed regions 420 of the deformable substrate 410. Further, FIG. 5B depicts scattering electron microscope (SEM) images of the deformable substrate and the deformed regions of FIG. 5A.

What is claimed is:

1. A method of modifying a deformable substrate, the method comprising:
    depositing a sessile liquid droplet on a first surface of a deformable substrate, the sessile liquid droplet forming a deformed region in the first surface of the deformable substrate, the deformed region comprising a recess and a perimeter rim, the recess extending toward a second surface of the deformable substrate, and the perimeter rim extending away from the second surface of the deformable substrate; and
    curing the deformable substrate, thereby increasing an elastic modulus of the deformable substrate such that upon removal of the sessile liquid droplet, the deformed region remains in the first surface of the deformable substrate.

2. The method of claim 1, wherein:
    the deformable substrate comprises an initial elastic modulus and a cured elastic modulus; and
    the cured elastic modulus is greater than the initial elastic modulus.

3. The method of claim 2, wherein the initial elastic modulus comprises from about 0.1 kPa to about 100 kPa.

4. The method of claim 2, wherein the cured elastic modulus comprises about 800 kPa or greater.

5. The method of claim 1, wherein the deformable substrate comprises polyvinylsiloxane, polydimethylsiloxane, or combinations thereof.

6. The method of claim 1, further comprising removing the sessile liquid droplet from contact with the deformable substrate.

7. The method of claim 6, wherein curing the deformable substrate removes the sessile liquid droplet from contact with the deformable substrate.

8. The method of claim 1, wherein:
    the recess terminates at a recess floor; and
    the recess comprises a recess depth extending from an undeformed plane of the first surface to the recess floor; and
    the recess depth is from about 50 nm to about 25 μm.

9. The method of claim 1, wherein:
    the perimeter rim terminates at a rim tip; and
    the perimeter rim comprises a rim height extending from an undeformed plane of the first surface to the rim tip; and
    the rim height is from about 100 nm to about 50 μm.

10. The method of claim 1, wherein the sessile liquid droplet comprises water, a polyol liquid, or combinations thereof.

11. The method of claim 10, wherein the polyol liquid of the sessile liquid droplet comprises ethylene glycol, glycerol, or combinations thereof.

12. The method of claim 1, wherein the sessile liquid droplet further comprises a plurality of nanoparticles such that, upon curing the deformable substrate, at least a portion of the plurality of nanoparticles are embedded in the deformed region of the deformable substrate.

13. The method of claim 12, wherein the plurality of nanoparticles comprise $TiO_2$, zinc oxide, zirconium oxide, silica, alumina, cerium oxide, or a combination thereof.

14. The method of claim 12, wherein the plurality of nanoparticles embedded in the deformed region of the deformable substrate comprise a higher refractive index than the deformable substrate.

15. The method of claim 12, wherein the plurality of nanoparticles embedded in the deformed region are configured to scatter light propagating through the deformed region of the deformable substrate.

16. The method of claim 1, further comprising depositing the deformable substrate on a second substrate, wherein the elastic modulus of the deformable substrate is less than an elastic modulus of the second substrate.

17. The method of claim 16, wherein the second substrate comprises a glass, glass-ceramic, or ceramic.

18. A method of modifying a deformable substrate, the method comprising:
    depositing a deformable substrate on a glass substrate;
    depositing a sessile liquid droplet comprising a plurality of nanoparticles on a first surface of the deformable substrate, the sessile liquid droplet forming a deformed region in the first surface of the deformable substrate, the deformed region comprising a recess and a perimeter rim, the recess extending toward a second surface of the deformable substrate, and the perimeter rim extending away from the second surface of the deformable substrate; and
    curing the deformable substrate, thereby increasing an elastic modulus of the deformable substrate such that upon removal of the sessile liquid droplet, the deformed region remains in the first surface of the deformable substrate and at least a portion of the plurality of nanoparticles are embedded in the perimeter rim of the deformed region of the deformable substrate, thereby forming an angular filter in the perimeter rim of the deformed region of the deformable substrate.

19. The method of claim 18, wherein the plurality of nanoparticles embedded in the perimeter rim of the deformed region of the deformable substrate comprise a higher refractive index than the deformable substrate.

20. The method of claim 18, wherein the plurality of nanoparticles embedded in the perimeter rim of the deformed region are configured to scatter light propagating through the perimeter rim.

\* \* \* \* \*